US008644686B2

United States Patent
Kang

(10) Patent No.: US 8,644,686 B2
(45) Date of Patent: Feb. 4, 2014

(54) IMAGE RECORDING METHOD FOR TIME SHIFT FUNCTION AND IMAGE RECORDING APPARATUS THEREOF

(75) Inventor: Hee-beom Kang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1497 days.

(21) Appl. No.: 11/716,630

(22) Filed: Mar. 12, 2007

(65) Prior Publication Data

US 2008/0025694 A1 Jan. 31, 2008

(30) Foreign Application Priority Data

Jul. 25, 2006 (KR) .......................... 10-2006-0069908

(51) Int. Cl.
*H04N 5/76* (2006.01)
*H04N 5/782* (2006.01)

(52) U.S. Cl.
CPC ..................................... *H04N 5/782* (2013.01)
USPC ........... 386/292; 386/213; 386/248; 386/291; 725/38

(58) Field of Classification Search
USPC ............ 386/200, 213, 291–293, 248; 725/38, 725/62
See application file for complete search history.

(56) References Cited

U.S. PATENT DOCUMENTS

| | | | | |
|---|---|---|---|---|
| 6,058,242 A * | 5/2000 | Kim | ............................... | 386/291 |
| 6,424,788 B1 * | 7/2002 | Jang | ............................... | 386/316 |
| 7,409,140 B2 * | 8/2008 | Rodriguez et al. | ............ | 386/248 |
| 2003/0110514 A1 * | 6/2003 | West et al. | ..................... | 725/134 |
| 2004/0156614 A1 * | 8/2004 | Bumgardner et al. | .......... | 386/46 |
| 2004/0194134 A1 * | 9/2004 | Gunatilake et al. | ............. | 725/38 |
| 2005/0138661 A1 * | 6/2005 | Matsukawa | ..................... | 725/62 |
| 2008/0002938 A1 * | 1/2008 | Osborne | ....................... | 386/46 |
| 2008/0095516 A1 * | 4/2008 | Katagishi et al. | ............... | 386/95 |
| 2009/0089832 A1 * | 4/2009 | Kendall | ......................... | 725/38 |

* cited by examiner

*Primary Examiner* — Hung Dang
*Assistant Examiner* — Mishawn Dunn
(74) *Attorney, Agent, or Firm* — Sughrue Mion, PLLC

(57) ABSTRACT

An image recording method for a time shift function and an image recording apparatus thereof are provided. The image recording method includes, if a channel is changed, tuning one of first and second tuners to the change channel, based on time information of each channel received through the first and second tuners, and controlling a record progress state of each channel image received through the first and second tuners based on the time information.

28 Claims, 2 Drawing Sheets

IMAGE RECORDING METHOD FOR TIME SHIFT FUNCTION AND IMAGE RECORDING APPARATUS THEREOF

CROSS-REFERENCE TO RELATED PATENT APPLICATION

This application claims priority from Korean Patent Application No. 10-2006-0069908, filed on Jul. 25, 2006 in the Korean Intellectual Property Office, the entire contents of which are hereby incorporated by reference.

BACKGROUND OF THE INVENTION

1. Field of the Invention

Apparatuses and methods consistent with the present invention relate to an image recording method for a time shift function and an image recording apparatus thereof, and more particularly to an image recording method for a time shift function and an image recording apparatus thereof supporting the time shift function by employing a Personal Video Recorder (PVR) function, which can allocate tuners according to a set standard, and record images when a channel is changed.

2. Description of the Related Art

A PVR is a personal digital video recording apparatus that can record an image signal in a large-capacity hard disk and reproduce the image signal recorded in the hard disk. An image recording apparatus supporting a time shift function by employing the PVR function comprises a digital television (DTV), a set-top box, and a digital video disc (DVD) recording apparatus.

For example, a DTV supporting the time shift function displays a program of a channel B while it records a program received through a channel A. In this state, if a user intends to view the program of the channel A after a lapse of time, the DTV reproduces the program of the channel A from the recording time point of the channel A, and simultaneously records the program of the channel A in real time.

However, the related art DTV supporting the time shift function in an environment where the number of tuners is limited operates such that if a user inputs a channel change command to change the channel A to the channel B while the program of the channel A is outputted through a display, the DTV tunes a first tuner from the channel A to the channel B, tunes a second tuner to the channel A, and inquires of the user whether to record the program of the channel A.

More specifically, the related art DTV tunes the first tuner to the channel to be outputted through the display, and tunes the second tuner to the channel previous to the channel change, i.e., the channel to be recorded. Accordingly, if a channel change command is inputted while the channel A tuned by the first tuner is outputted through the display, the DTV tunes the first tuner from the channel A to the channel B, and tunes the second tuner to the channel A.

Accordingly, the first tuner tunes the changed channel and the second tuner tunes the channel having been tuned by the first tuner whenever the channel is changed, so that all the channels being tuned are changed. This causes the efficiency to deteriorate.

Also, whenever the channel is changed, the related art image recording apparatus inquires of a user whether to record the program of the channel previous to the channel change through an On-Screen Display (OSD) to perform the time shift function, and records the program of the channel previous to the channel change if the user chooses to record the program. In this state, if the channel is changed again to the channel being recorded, the recording of the program of the selected channel is terminated.

Accordingly, the user selects whether to record the program of the channel previous to the channel change whenever the channel is changed, and this causes inconvenience in use. Also, if the channel is changed again to the channel being recorded, the recording of the corresponding channel program is terminated, and this causes the image being received in real time not to be recorded in the case of viewing the program recorded in a time shift mode.

Further, since the user directly selects and deletes the program recorded for the time shift, this causes an inconvenience to the user, and the use efficiency of the storage space deteriorates.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, there is provided an image recording method for a time shift function and an image recording apparatus thereof, which can allocate tuners according to a set standard, control a record progress state for the time shift function, and record images when a channel is changed.

According to another aspect of the present invention, there is provided an image recording method which comprises if a channel is changed, tuning one of first and second tuners to the changed channel based on time information of each channel received through the first and second tuners, and controlling a record progress state of each channel image received through the first and second tuners based on the time information of each channel received through the first and second tuners.

The image recording method may further comprise tuning the channel received through the first tuner if a power is applied. If the channel is changed, the second tuner functions as a spare tuner which is not currently used, and the changed channel is tuned by the second tuner.

The image recording method may further comprise displaying and recording an image of the channel received through the first tuner, and if the channel is changed, checking a viewing time of the channel received through the first tuner, and if the checked viewing time exceeds a threshold time, continuously recording the image of the channel received through the first tuner.

In this instance, the threshold time determines whether the recording of the recording image is continued or terminated, and the threshold time is a default value or is set by a user.

The tuning the changed channel may comprise, if there is no spare tuner which is not currently used in the first and second tuners when the channel is changed, checking a viewing time of each channel received through the first and second tuners, and tuning the changed channel to a tuner of the channel of which the viewing time is shortest.

In the controlling the record progress state, if a non-viewing time of a channel image which is recorded in a non-viewing state is above a threshold time, recording of a channel image may be terminated, and a recorded channel image may be deleted.

In this instance, the threshold time determines whether the recording of the recording image is continued or terminated, and the threshold time is a default value or is set by a user.

In the controlling the record progress state, if it is determined that the time shift is not applied to a channel image of which recording is completed, the channel image of which recording is completed may be deleted.

In the controlling the record progress state, if the channel is changed to a channel previous to a channel change after a lapse of a threshold time from the channel change, an image of the channel previous to the channel change which is recorded from a channel change time point is displayed, and an image received in real time through the channel previous to the channel change is recorded.

In the controlling the record progress state, if the channel is changed to the channel previous to a channel change after the lapse of the threshold time from the channel change, a user is inquired whether to apply a time shift to the image of the channel previous to the channel change which is recorded from the channel change time point.

In the controlling the record progress state, the image of each channel received through the first and second tuners is recorded, and if a viewing time of each channel image exceeds a threshold time, each channel image received through the first and second tuners is continuously recorded.

In this instance, the threshold time determines whether the recording of a recording image is continued or terminated, and the threshold time is a default value or is set by a user.

In the controlling the record progress state, the image of each channel received through the first and second tuners is recorded, and if a non-viewing time of each channel image is above a threshold time, recording of each channel image received through the first and second tuners is terminated, and a recorded channel image is deleted.

In this instance, the threshold time determines whether the recording of a recording image is continued or terminated, and the threshold time is a default value or is set by a user.

If a power is off, all recorded channel images may be deleted.

According to another aspect of the present invention, there is provided an image recording apparatus which comprises first and second tuners, and a control unit which tunes one of first and second tuners to a changed channel based on time information of each channel received through the first and second tuners, if a channel is changed, and which controls a record progress state of each channel image received through the first and second tuners based on the time information of each channel received through the first and second tuners.

The control unit may tune the channel received through the first tuner if a power is applied, and if the channel is changed, the control unit may determine the second tuner as a spare tuner which is not currently used, and tune the changed channel through the second tuner.

The control unit may display and record an image of the channel received through the first tuner, check a viewing time of the channel received through the first tuner if the channel is changed, and if the checked viewing time exceeds a threshold time, continuously record the image of the channel received through the first tuner.

In this instance, the threshold time determines whether the recording of a recording image is continued or terminated, and the threshold time is a default value or is set by a user.

If it is determined that there is no spare tuner which is not currently used in the first and second tuners when the channel is changed, the control units checks a viewing time of each channel received through the first and second tuners, and tunes the changed channel to a tuner of the channel of which the viewing time is shortest.

If a non-viewing time of a channel image which is recorded in a non-viewing state is above a threshold time, the control unit may terminate recording of a recording channel image, and delete the recorded channel image.

The threshold time determines whether the recording of the recording image is continued or terminated, and the threshold time is a default value or is set by a user.

If it is determined that a time shift is not applied to a channel image of which recording is completed, the control unit may delete the channel image of which recording is completed.

If the channel is changed to a channel previous to a channel change after a lapse of a threshold time from the channel change, the control unit may display an image of the channel previous to the channel change which is recorded from a channel change time point, and record an image received in real time through the channel previous to the channel change.

If the channel is changed to the channel previous to a channel change after the lapse of a threshold time from the channel change, the control unit may inquire of a user whether to apply a time shift to the image of the channel previous to the channel change which is recorded from the channel change time point.

The control unit may record the image of each channel received through the first and second tuners, and if a viewing time of each channel image exceeds a threshold time, the control unit may continuously record each channel image received through the first and second tuners.

In this instance, the threshold time determines whether the recording of a recording image is continued or terminated, and the threshold time is a default value or is set by a user.

The control unit may record the image of each channel received through the first and second tuners, and if a non-viewing time of each channel image is above a threshold time, the control unit may terminate recording of each channel image received through the first and second tuners and delete a recorded channel image.

In this instance, the threshold time determines whether the recording of a recording image is continued or terminated, and the threshold time is a default value or is set by a user.

If a power is off, all recorded channel images may be deleted.

BRIEF DESCRIPTION OF THE DRAWINGS

The above and other aspects of the present invention will become more apparent by describing in detail exemplary embodiments thereof with reference to the attached drawing figures, wherein.

DETAILED DESCRIPTION OF EXEMPLARY EMBODIMENTS OF THE PRESENT INVENTION

Figure 1:
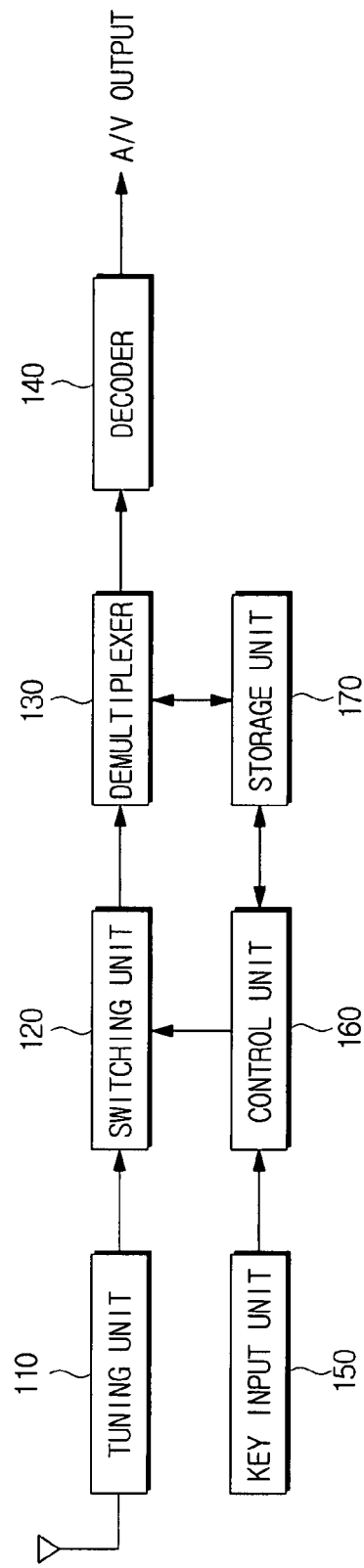
FIG. 1 is a block diagram of a DTV supporting a time shift function according to an exemplary embodiment of the present invention.

Hereinafter, exemplary embodiments of the present invention will be described in detail with reference to the accompanying drawing figures.

In the following description, the same drawing reference numerals are used for the same elements, even in different drawings. The matters defined in the description, such as a detailed construction and elements, are provided to assist in a comprehensive understanding of the invention. Thus, it is apparent that the present invention can be carried out without those defined matters. Also, well-known functions or constructions are not described in detail, since they would obscure the invention in unnecessary detail.

FIG. 1 is a block diagram of a DTV supporting a time shift function according to an exemplary embodiment of the present invention.

The DTV is an example of an image recording apparatus that can support the time shift function, allocate a tuner according to a set standard when a channel is changed, and control a record progress state for the time shift.

Referring to FIG. 1, the DTV comprises a tuner unit 110, a switching unit 120, a demultiplexer 130, a decoder 140, a key input unit 150, a control unit 160, and a storage unit 170.

The tuner unit 110 receives and demodulates a broadcasting signal through an antenna, and includes at least two tuners. The tuner unit 110 is illustrated to include two tuners, that is, a first tuner and a second tuner.

The switching unit 120 selectively switches the broadcasting signal demodulated by the tuner unit 110 under the control of the control unit 160, and includes two switches for each tuner. For example, the first tuner performs a switching operation in such a manner that a broadcasting signal of a channel A received through the first tuner is displayed and simultaneously recorded, while the second tuner performs a switching operation in such a manner that a broadcasting signal of a channel B received through the second tuner is recorded.

The demultiplexer 130 divides the broadcasting signal switched by the switching unit 120 into an audio signal and an image signal. The decoder 140 decodes the audio and image signals divided by the demultiplexer 130 to output the decoded signals.

The key input unit 150 includes keys for inputting a channel change command, such as numerical keys for directly inputting a channel and cursor keys for moving the channel up and down. In addition, the key input unit 150 may include a key for selecting the application of the time shift function.

The control unit 160 controls the switching unit 120 to output the broadcasting signal received through the tuner unit 110 and to display the same, and stores the broadcasting signal received through the tuner unit 110 in the storage unit 170 to perform the time shift function.

The control unit 160 is provided with a timer function, so that it judges an available tuner according to a channel change time when the channel is changed, and controls a storage progress state of the broadcasting signal for the time shift function according to the non-viewing time.

The storage unit 170 stores the broadcasting signal for the time shift function. More specifically, the storage unit 170 stores the broadcasting signal of the channel currently displayed, and the broadcasting signal of the channel previous to the channel change.

Figure 2:
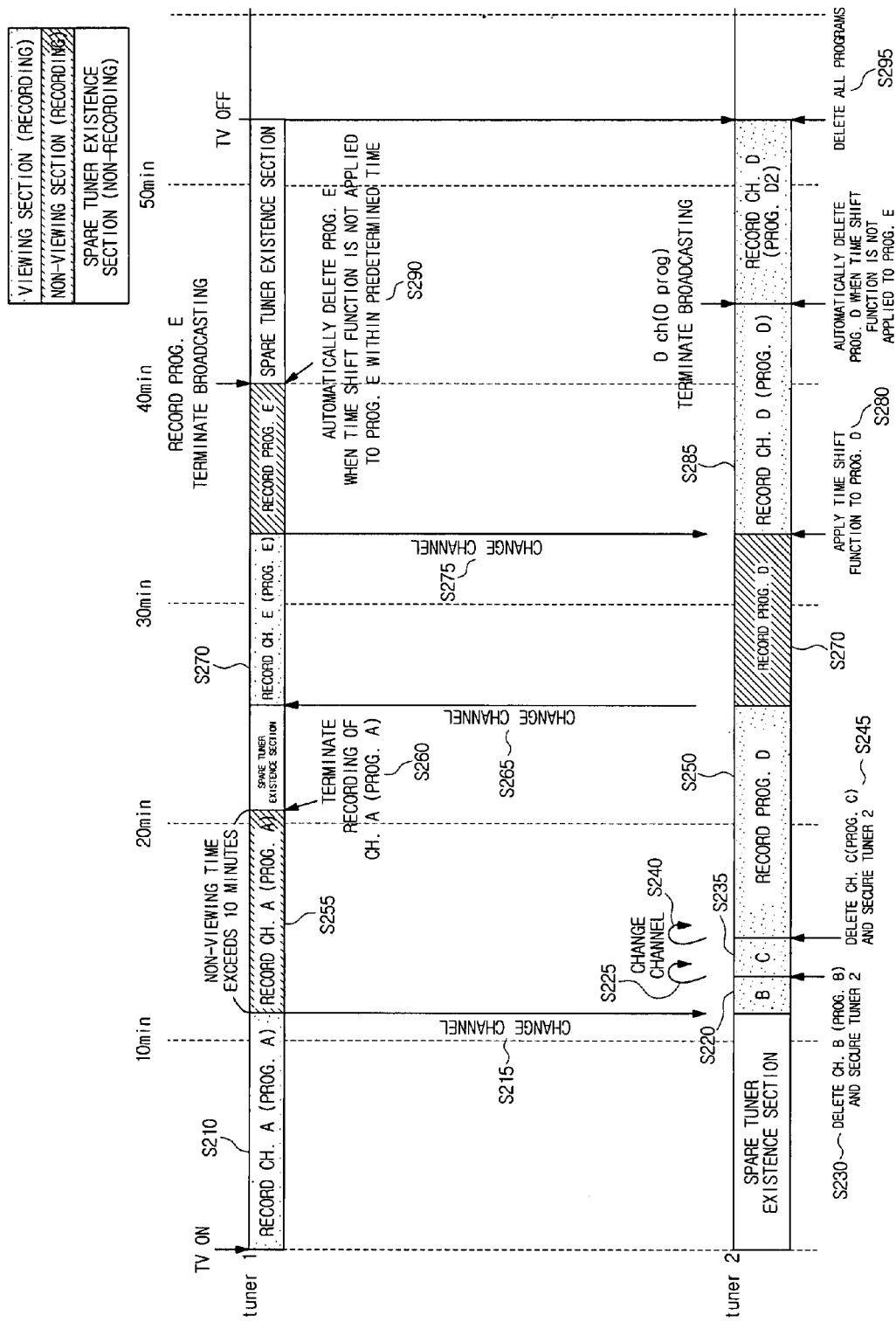
FIG. 2 is a view explaining an image recording method for a time shift function of a DTV according to an exemplary embodiment of the present invention.

FIG. 2 is a view explaining an image recording method for the time shift function of a DTV according to an exemplary embodiment of the present invention.

Referring to FIG. 2, when the power is applied, the first tuner receives an initial channel, for example, a program A of a channel A, under the control of the control unit 160. The control unit 160 controls the switching unit 120 so that the program of the channel A received through the first tuner is displayed, thereby allowing a user to view the same, and simultaneously is recorded in the storage unit 170 (S210). In this instance, a spare tuner exists, since the second tuner does not receive the broadcasting signal.

A dotted portion is an audience section subject to recording. A hatched portion is a non-viewing section subject to recording for the time shift function. A spare tuner existence section is a non-recording section in which the broadcasting signal is not received.

If a channel change command is inputted through the key input unit 150 (S215), the control unit 160 determines whether a spare tuner exists, and receives a program of a channel B through the second tuner to display the same, so that a user views it. At the same time, the control unit 160 records the program of the channel B in the storage unit 170 (S220). In this instance, the region of the storage unit 170 in which the program of the channel A received through the first tuner is stored is different from the region of the storage unit 170 in which the program of the channel B received through the second tuner is stored.

If the channel change command is again inputted through the key input unit 150 (S225), the control unit 160 checks a viewing time of each channel by use of the timer function, and allocates a tuner of the channel of which the channel change time is shortest, based on the checked viewing time of each channel, to the changed channel. That is, the control unit 160 secures the second tuner receiving the channel B of which the channel change time is shortest, and deletes the recorded program of the channel B (S230), since the viewing time of the channel A is long and the viewing time of the channel B is short. Then, the control unit 160 receives a program of a channel C through the second tuner secured to display the same so that a user views it, and simultaneously records the same in the storage unit 170 (S235).

In addition, if the channel change command is inputted through the key input unit 150 (S240), the control unit 160 secures the second tuner receiving the channel C of which the channel change time is shortest, and deletes the recorded program of the channel C (S245). Then, the control unit 160 receives a program of a channel D through the second tuner secured to display the same so that a user views it, and simultaneously records the same in the storage unit 170 (S250).

If the channel change command is inputted (S215), the control unit 160 continuously receives the program of the channel A, of which the checked viewing time is above a predetermined time, through the first tuner, and records the same in the storage unit 170. Also, the control unit 160 determines whether the non-viewing time of the program of the channel A exceeds a predetermined time, such as 10 minutes (S255). When the channel is changed, the viewing time to determine whether the program previous to the channel change is continuously recorded, and the non-viewing time to determine whether the program is continuously recorded during the non-viewing time, are default values, such as 10 minutes, and may be set by the user.

For example, if the channel change command is inputted, the control unit 160 determines whether the viewing time of the program previous to the channel change is above 10 minutes, and continuously receives the program previous to the channel change in the storage unit 170, if it is determined that the viewing time is above 10 minutes. At the same time, the control unit 160 displays and records the program of the changed channel so that a user views the same, and determines whether the non-viewing time of the recording program exceeds 10 minutes.

If it is determined that the non-viewing time of the program of the channel A exceeds 10 minutes, the control unit 160 terminates the recording of the program of the channel A, and deletes the recorded program of the channel A from the storage unit 170 (S260). Therefore, the first tuner exists as a spare tuner, since it does not receive the channel A.

The control unit 160 receives the program of the channel D to display the same so that a user views it (S250). At the same time, if the channel change command is inputted while the program of the channel D is recorded in the storage unit 170 (S265), the control unit 160 receives a program of a channel E through the first tuner to display the same so that a user views it, since the first tuner exists as a spare tuner. In addition, the control unit 160 records the program of the channel E in the storage unit 170, also receives the program of the channel D through the second tuner to record the same in the storage unit 170 (S270).

If the channel change command to change the channel to the channel D is again inputted (S275), the control unit 160 automatically applies the time shift function to the recorded program of the channel D from the time point when a user views the program (S280). That is, the control unit 160 displays the program of the channel D from the time point when the program is recorded, in the case where the channel is changed (S265). Alternatively, the control unit 160 inquires of a user whether to apply the time shift function to the program of the channel D recorded from the time point when a user does not view the program.

In the case where the time shift function is applied to the program of the channel D recorded from the time point when a user does not view the program, the control unit 160 records the program of the channel D, which is received in real time, in the storage unit 170 (S285). Otherwise, if the user selects that the time shift function is not applied to the program of the channel D recorded from the time point when the user does not view the program, the control unit 160 displays the program of the channel D, which is received in real time, and records the same in the storage unit 170.

In this instance, the control unit 160 automatically deletes the recorded program of the channel E from the storage unit 170 (S290), when the broadcast of the program of the channel E recording is terminated, and the time shift function is not applied to the program of the channel E within a predetermined time. More specifically, the control unit 160 automatically deletes the recorded program in the case where the user does not apply the time shift function to the program of which the recording is terminated or broadcast is terminated, if the user does not view the program again.

If the power is off, the control unit 160 deletes all recorded programs (S295).

As abovementioned, according to exemplary embodiments of the present invention, when the channel is changed, the tuner allocation is straightforward. The record progress state for the time shift is automatically controlled, thereby increasing the convenience of the user. Also, the storage space can be effectively used, without using it wastefully.

While the invention has been shown and described with reference to certain exemplary embodiments thereof, it will be understood by those skilled in the art that various changes in form and details may be made therein without departing from the spirit and scope of the invention as defined by the appended claims and their legal equivalents.

What is claimed is:

1. An image recording method comprising:
   if a channel is changed, tuning the changed channel by using one of first and second tuners, based on time information of each channel received through the first and second tuners; and
   controlling a record progress state of each channel image received through the first and second tuners based on the time information,
   wherein the controlling the record progress state of each channel image comprises checking the time information of each channel received through the first and second tuners when the channel is changed and generating a checked result,
   wherein the tuning the changed channel uses the checked result as the time information,
   wherein the time information of each channel is an information according to at least one of a viewing time of the image of the each channel displayed on a screen and a non-viewing time of the each channel, and
   wherein the tuning the changed channel comprises:
   if there is no spare tuner which is not currently used in the first and second tuners when the channel is changed, checking a viewing time of each channel received through the first and second tuners; and
   tuning the changed channel to a tuner of the channel of which the viewing time is shortest.

2. The image recording method of claim 1, further comprising tuning the channel received through the first tuner if a power is applied;
   wherein if the channel is changed, the second tuner functions as a spare tuner which is not currently used, and the changed channel is tuned by the second tuner.

3. The image recording method of claim 1, further comprising:
   displaying and recording an image of the channel received through the first tuner, and if the channel is changed, checking a viewing time of the channel received through the first tuner; and
   if the checked viewing time exceeds a threshold time, continuously recording the image of the channel received through the first tuner.

4. The image recording method of claim 3, wherein the threshold time determines whether the recording of a recording image is continued or terminated, and the threshold time is a default value or is set by a user.

5. The image recording method of claim 1, wherein in the controlling the record progress state, if a non-viewing time of a channel image which is recorded in a non-viewing state is above a threshold time, recording of a recording channel image is terminated, and a recorded channel image is deleted.

6. The image recording method of claim 5, wherein the threshold time determines whether the recording of the recording image is continued or terminated, and the threshold time is a default value or is set by a user.

7. The image recording method of claim 1, wherein in the controlling the record progress state, if a time shift is not applied to a channel image of which recording is completed, the channel image of which recording is completed is deleted.

8. The image recording method of claim 1, wherein in the controlling the record progress state, the image of each channel received through the first and second tuners is recorded, and if a viewing time of each channel image exceeds a threshold time, each channel image received through the first and second tuners is continuously recorded.

9. The image recording method of claim 8, wherein the threshold time determines whether the recording of a recording image is continued or terminated, and the threshold time is a default value or is set by a user.

10. The image recording method of claim 1, wherein in the controlling the record progress state, the image of each channel received through the first and second tuners is recorded, and if a non-viewing time of each channel image is above a threshold time, recording of each channel image received through the first and second tuners is terminated, and a recorded channel image is deleted.

11. The image recording method of claim 10, wherein the threshold time determines whether the recording of a recording image is continued or terminated, and the threshold time is a default value or is set by a user.

12. The image recording method of claim 1, wherein if a power is off, all recorded channel images are deleted.

13. An image recording method comprising:
   if a channel is changed, tuning the changed channel by using one of first and second tuners, based on time information of each channel received through the first and second tuners; and
   controlling a record progress state of each channel image received through the first and second tuners based on the time information,
   wherein the controlling the record progress state of each channel image comprises checking the time information of each channel received through the first and second tuners when the channel is changed and generating a checked result,
   wherein the tuning the changed channel uses the checked result as the time information,
   wherein the time information of each channel is an information according to at least one of a viewing time of the image of the each channel displayed on a screen and a non-viewing time of the each channel, and
   wherein in the controlling the record progress state, if the channel is changed to a channel previous to a channel change after a lapse of a threshold time from the channel change, an image of the channel previous to the channel change which is recorded from a channel change time point is displayed, and an image received in real time through the channel previous to the channel change is recorded.

14. The image recording method of claim 13, wherein in the controlling the record progress state, if the channel is changed to the channel previous to a channel change after the lapse of a threshold time from the channel change, a user is inquired whether to apply a time shift to the image of the channel previous to the channel change which is recorded from the channel change time point.

15. An image recording apparatus comprising:
   a first tuner;
   a second tuner; and
   a control unit which tunes a changed channel by using one of first and second tuners, based on time information of each channel received through the first and second tuners, if a channel is changed, and which controls a record progress state of each channel image received through the first and second tuners based on the time information of,
   wherein the control unit checks the time information of each channel received through the first and second tuners when the channel is changed, generates a checked result and uses the checked result as the time information,
   wherein the time information of each channel is an information according to at least one of a viewing time of the image of the each channel displayed on a screen and a non-viewing time of the each channel, and
   wherein if there is no spare tuner which is not currently used in the first and second tuners when the channel is changed, the control units checks a viewing time of each channel received through the first and second tuners, and tunes the changed channel to a tuner of the channel of which the viewing time is shortest.

16. The image recording apparatus of claim 15, wherein the control unit tunes the channel received through the first tuner if a power is applied, and if the channel is changed, the second tuner functions as a spare tuner which is not currently used, and the changed channel is tuned by the second tuner.

17. The image recording apparatus of claim 15, wherein the control unit displays and records an image of the channel received through the first tuner, checks a viewing time of the channel received through the first tuner if the channel is changed, and if the checked viewing time exceeds a threshold time, continuously records the image of the channel received through the first tuner.

18. The image recording apparatus of claim 17, wherein the threshold time determines whether the recording of a recording image is continued or terminated, and the threshold time is a default value or is set by a user.

19. The image recording apparatus of claim 15, wherein if a non-viewing time of a channel image which is recorded in a non-viewing state is above a threshold time, the control unit terminates recording of a recording channel image, and deletes the recorded channel image.

20. The image recording apparatus of claim 19, wherein the threshold time determines whether the recording of the recording image is continued or terminated, and the threshold time is a default value or is set by a user.

21. The image recording apparatus of claim 15, wherein if a time shift is not applied to a channel image of which recording is completed, the control unit deletes the channel image of which recording is completed.

22. The image recording apparatus of claim 15, wherein the control unit records the image of each channel received through the first and second tuners, and if a viewing time of each channel image exceeds a threshold time, the control unit continuously records each channel image received through the first and second tuners.

23. The image recording apparatus of claim 22, wherein the threshold time determines whether the recording of a recording image is continued or terminated, and the threshold time is a default value or is set by a user.

24. The image recording apparatus of claim 15, wherein the control unit records the image of each channel received through the first and second tuners, and if a non-viewing time of each channel image is above a threshold time, the control unit terminates recording of each channel image received through the first and second tuners and deletes a recorded channel image.

25. The image recording apparatus of claim 24, wherein the threshold time determines whether the recording of a recording image is continued or terminated, and the threshold time is a default value or is set by a user.

26. The image recording apparatus of claim 15, wherein if a power is off, all recorded channel images are deleted.

27. An image recording apparatus comprising:
   a first tuner;
   a second tuner; and
   a control unit which tunes a changed channel by using one of first and second tuners, based on time information of each channel received through the first and second tuners, if a channel is changed, and which controls a record progress state of each channel image received through the first and second tuners based on the time information of,
   wherein the control unit checks the time information of each channel received through the first and second tuners when the channel is changed, generates a checked result and uses the checked result as the time information,
   wherein the time information of each channel is an information according to at least one of a viewing time of the image of the each channel displayed on a screen and a non-viewing time of the each channel, and wherein if the channel is changed to a channel previous to a channel change after a lapse of a threshold time from the channel change, the control unit displays an image of the channel previous to the channel change which is recorded from a channel change time point, and records an image received in real time through the channel previous to the channel change.

28. The image recording apparatus of claim 27, wherein if the channel is changed to the channel previous to a channel change after the lapse of a threshold time from the channel change, the control unit inquires of a user whether to apply a time shift to the image of the channel previous to the channel change which is recorded from the channel change time point.

* * * * *